United States Patent [19]

Sakamoto et al.

[11] Patent Number: 4,939,545
[45] Date of Patent: Jul. 3, 1990

[54] APPARATUS FOR ADJUSTING OPTICAL SYSTEM OF AN IMAGE FORMING APPARATUS

[75] Inventors: Naoki Sakamoto, Hirakata; Masanori Itakiyo, Sakai, both of Japan

[73] Assignee: Mita Industrial Co., Ltd., Osaka, Japan

[21] Appl. No.: 364,369

[22] Filed: Jun. 12, 1989

[30] Foreign Application Priority Data

Jun. 15, 1988 [JP] Japan .................................. 63-147795

[51] Int. Cl.$^5$ ........................................... G03B 27/52
[52] U.S. Cl. ........................................ 355/55; 355/57; 355/233
[58] Field of Search .................... 355/51, 55, 57, 60, 355/65, 66, 233, 235, 243

[56] References Cited

U.S. PATENT DOCUMENTS

| | | | |
|---|---|---|---|
| 4,634,267 | 1/1987 | Jones et al. | 355/233 X |
| 4,645,329 | 2/1987 | Iwaki | 355/233 |
| 4,862,218 | 8/1989 | Tsunoda et al. | 355/233 X |

Primary Examiner—Richard A. Wintercorn
Attorney, Agent, or Firm—Beveridge, DeGrandi & Weilacher

[57] ABSTRACT

Adjusting apparatus adapted to adjust the positions of a first moving frame and a second moving frame respectively engaged with a pair of wrapping power transmission members installed with a predetermined distance provided therebetween. The adjusting apparatus comprises a shaft, an adjustment plate rotatably integrally with the shaft, a first member to be wrapped and a second member to be wrapped. The shaft is rotatably supported by a pair of lateral plates. The adjustment plate is attached to one of the lateral plates so as to be adjustable in rotation. The first member to be wrapped is rotatably supported by one end of the shaft and secured to one of the wrapping power transmission members. The second member to be wrapped is secured to the other end of the shaft and secured to the other wrapping power transmission member. The adjustment plate and the first member to be wrapped are engaged with each other so as to be adjustable in relative rotation in the circumferential direction of the first member to be wrapped.

5 Claims, 5 Drawing Sheets

APPARATUS FOR ADJUSTING OPTICAL SYSTEM OF AN IMAGE FORMING APPARATUS

BACKGROUND OF THE INVENTION

The present invention relates to apparatus for adjusting optical system of an image forming apparatus, which is mounted on the optical system for scanning and exposing the original document to light by moving first and second moving frames to which mirrors are respectively secured, and which is adapted to adjust the positional relationship between both moving frames.

Conventionally, an electrophotographic copying apparatus as an example of the image forming apparatus is provided with an optical system for illuminating an original document placed on a transparent platen, so that the reflected light from the original document is guided to the photoreceptor through a plurality of mirrors.

Generally, the first moving frame having an illumination device and the first mirror secured thereto is moved in parallel to the original document, and the second moving frame having the second and third mirrors secured thereto is moved at a speed equal to ½ of that of the first moving frame, such that the original document is scanned and exposed to light by the optical system. The movement of the first and second moving frames is achieved by driving a pair of wires with which the moving frames are respectively engaged.

If the positional relationship between the first and second moving frames (the parallelism and distance between both moving frames) is out of order, a proper optical path length may not be obtained, causing the image to be out of focus.

To prevent the image from being out of focus, there is proposed an optical system adjusting apparatus for adjusting the positional relationship between the first and second moving frames at the home positions thereof. Examples of such optical system adjusting apparatus include apparatus of the type of adjusting the wire end mounting positions and apparatus of the pulley wrapping type.

In the apparatus of the type of adjusting the wire end mounting positions, as disclosed by Japanese Unexamined Patent Publication No. 59-146045, a pair of wires which respectively engage with the ends of the moving frames, have fixed ends attached to the wall surface of the electrophotographic copying apparatus such that the positions of these fixed ends may be adjusted. By adjusting these positions, the moving frames may be adjusted in position.

In the apparatus of the pulley wrapping type, as disclosed by Japanese Unexamined Patent Publication No. 62-240948, a pair of wires are respectively wound several times, at the mid-portions thereof, on a pair of take-up pulleys which are secured to the prime shaft in a manner rotatable with respect thereto. By loosening the take-up pulleys with respect to the prime shaft to rotatingly adjust the pulleys in the circumferential direction, the moving frames may be adjusted in position.

In the conventional apparatus of both types, the adjustment in distance between the moving frames is achieved by alternately adjusting the distances between both ends of the respective moving frames. This disadvantageously requires much labor.

SUMMARY OF THE INVENTION

It is an object of the present invention to provide apparatus for adjusting optical system of an image forming apparatus, which is capable of adjusting the parallelism between both moving frames and facilitating the adjustment of the distance between both moving frames, as well as preventing the moving frames from being vibrated.

The object above-mentioned may be achieved by providing apparatus for adjusting optical system of an image forming apparatus, having the following arrangement.

Apparatus for adjusting optical system of an image forming apparatus, adapted to adjust the positions of a first moving frame and a second moving frame respectively engaged with a pair of wrapping power transmission members which are wrapped round pulleys and being installed with a predetermined distance provided therebetween, comprising:

a shaft rotatably supported by a pair of lateral plates;

an adjustment plate disposed at one end of said shaft so as to be rotatable integrally therewith, said adjustment plate being attached to one of said lateral plates so as to be adjustable in rotation in the rotation direction of said shaft;

a first member to be wrapped rotatably supported by said one end of said shaft, to which one of said wrapping power transmission members is secured; and a second member to be wrapped secured to the other end of said shaft, to which the other wrapping power transmission member of said wrapping power transmission members is secured, said adjustment plate and said first member to be wrapped being engaged with each other so as to be adjustable in relative rotation in the circumferential direction of said first member to be wrapped.

According to the apparatus for adjusting optical system of an image forming apparatus having the arrangement above-mentioned, with the adjustment plate attached to the lateral plate, i.e., with the shaft and the second member to be wrapped regulated in rotation by the adjustment plate, the relative position of the first member to be wrapped with respect to the adjustment plate may be rotatingly adjusted, so that only the wrapping power transmission member secured to the first member to be wrappied is moved to adjust the parallelism between the moving frames.

With the first member to be wrapped engaged with the adjustment plate, i.e., with the shaft, the second member to be wrapped, the first member to be wrapped and the adjustment plate being integrally rotatable, the adjustment plate may be rotatingly adjusted to move both wrapping power transmission members, thereby to adjust the distance between the moving frames.

Further, since the adjustment plate is attached to the lateral plate, the adjustments above-mentioned may be made at the side of the image forming apparatus.

EMBODIMENT

The following description will discuss in detail the present invention with reference to the drawings showing embodiments thereof.

Figure 6:
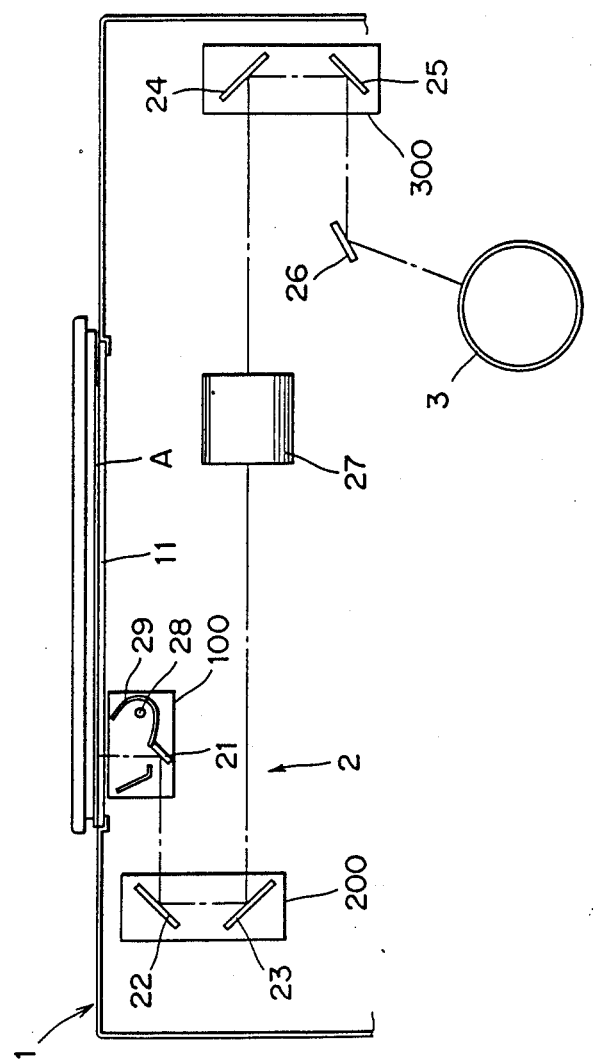
FIG. 6 is a schematic view of the arrangement of an electrophotographic copying apparatus.

In FIG. 6, an optical system 2 includes a halogen lamp 28, a reflection plate 29, an optical lens 27, and mirrors 21, 22, 23, 24, 25 and 26. The optical system 2 is arranged such that an original document A placed on a transparent platen 11 is illuminated by the halogen lamp 28 and the reflection plate 29, and the light reflected from the original document A is guided to the optical lens 27 through the first mirror 21, the second mirror 22 and the third mirror 23 in succession. The light is further guided to a photoreceptor drum 3 through the fourth mirror 24, the fifth mirror 25 and the sixth mirror 26 in succession. Thus, an image corresponding to the original document A is formed on the photoreceptor drum 3.

The first mirror 21 is attached to a first moving frame 100 to which attached are the halogen lamp 28 for illuminating the original document A and the reflection plate 29. The second mirror 22 and the third mirror 23 are attached to a second moving frame 200. The fourth mirror 24 and the fifth mirror 25 are attached to a third moving frame 300.

For an equal-magnification copy, the first moving frame 100 is moved along the underside of the transparent platen 11 and the second moving frame 200 is moved in the same direction as that of the first moving frame 100 at a speed equal to ½ of that of the first moving frame 100. Thus, the original document A is scanned and exposed to light with the optical distance between the original document A and the photoreceptor drum 3 maintained constant.

For an enlarging or reducing copy, the moving speeds of the first moving frame 100 and the second moving frame 200 are changed, and the optical lens 27 and the third moving frame 300 are shifted in position, so that the optical distance between the original document A and the photoreceptor drum 3 is changed.

Figure 5:
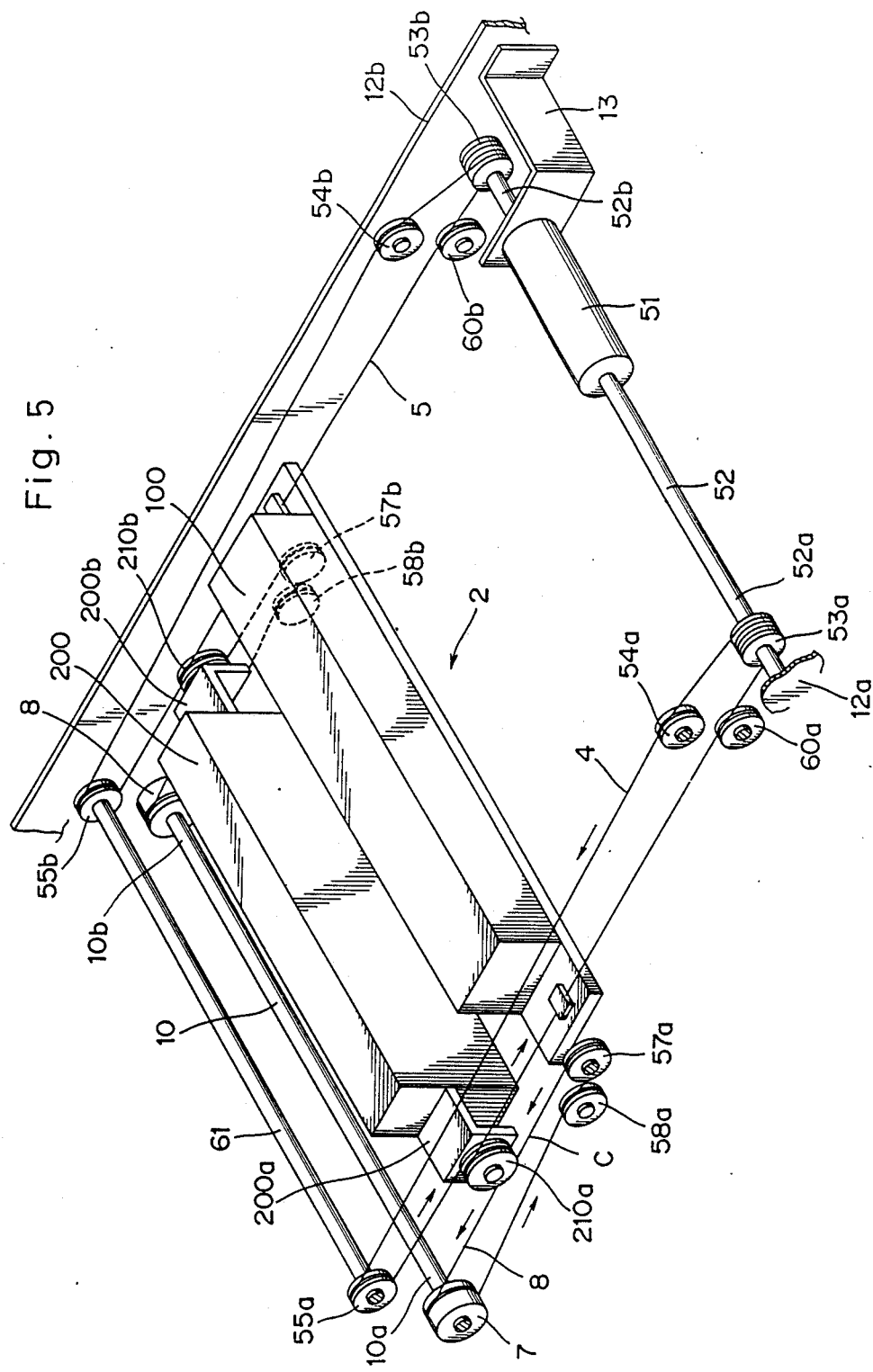
FIG. 5 is a schematic perspective view illustrating how wires are respectively arranged in moving frames.

With reference to FIG. 5, the movement of the first moving frame 100 and the second moving frame 200 is achieved by a pair of wires 4, 5 installed in parallel to each other. One wire 4 has one end secured to a take-up pulley 53a fixed to the drive shaft 52 of a motor 51. After wound several times on the take-up pulley 53a, the wire 4 passes through a guide pulley 54a and is turned in direction by a pulley 55a. The wire 4 is further turned in direction by a floating pulley 210a disposed at one end 200a of the second moving frame 200. Then, the wire 4 is successively turned in direction by a first adjustment pulley 7 and a pulley 57a. After turned in direction again by the floating pulley 210a, the wire 4 is secured to the first moving frame 100 and returned to the take-up pulley 53a through a guide pulley 60a. After wound several times, the wire 4 is fixed to the take-up pulley 53a. A tension pulley 58a is disposed for applying tension to the wire 4.

Likewise, the other wire 5 has one end secured to a take-up pulley 53b. After wound several times thereon, the wire 5 passes through a guide pulley 54b and is turned in direction by a pulley 55b. Further, the wire 5 is turned in direction by a floating pulley 210b disposed at the other end 200b of the second moving frame 200. Then, the wire 5 is successively turned in direction by a second adjustment pulley 8 and a pulley 57b. After turned in direction again by the floating pulley 210b, the wire 5 is secured to the first moving frame 100 and returned to the take-up pulley 53b through a guide pulley 60b. After wound several times on the take-up pulley 53b, the wire 5 is fixed thereto. A tension pulley 58b is disposed for applying tension to the wire 5.

The drive shaft 52 of the motor 51 has one end 52a supported by one lateral plate 12a and the other end 52b rotatably supported by a support plate 13 disposed at the other lateral plate 12b. A shaft 61 supporting the pulleys 55a, 55b is supported by the lateral plates 12a, 12b. The lateral plates 12a, 12b may be the wall surfaces of the copying machine 1, structural plates inside the machine 1 or supporting plates attached to the structural plates.

Figure 1:
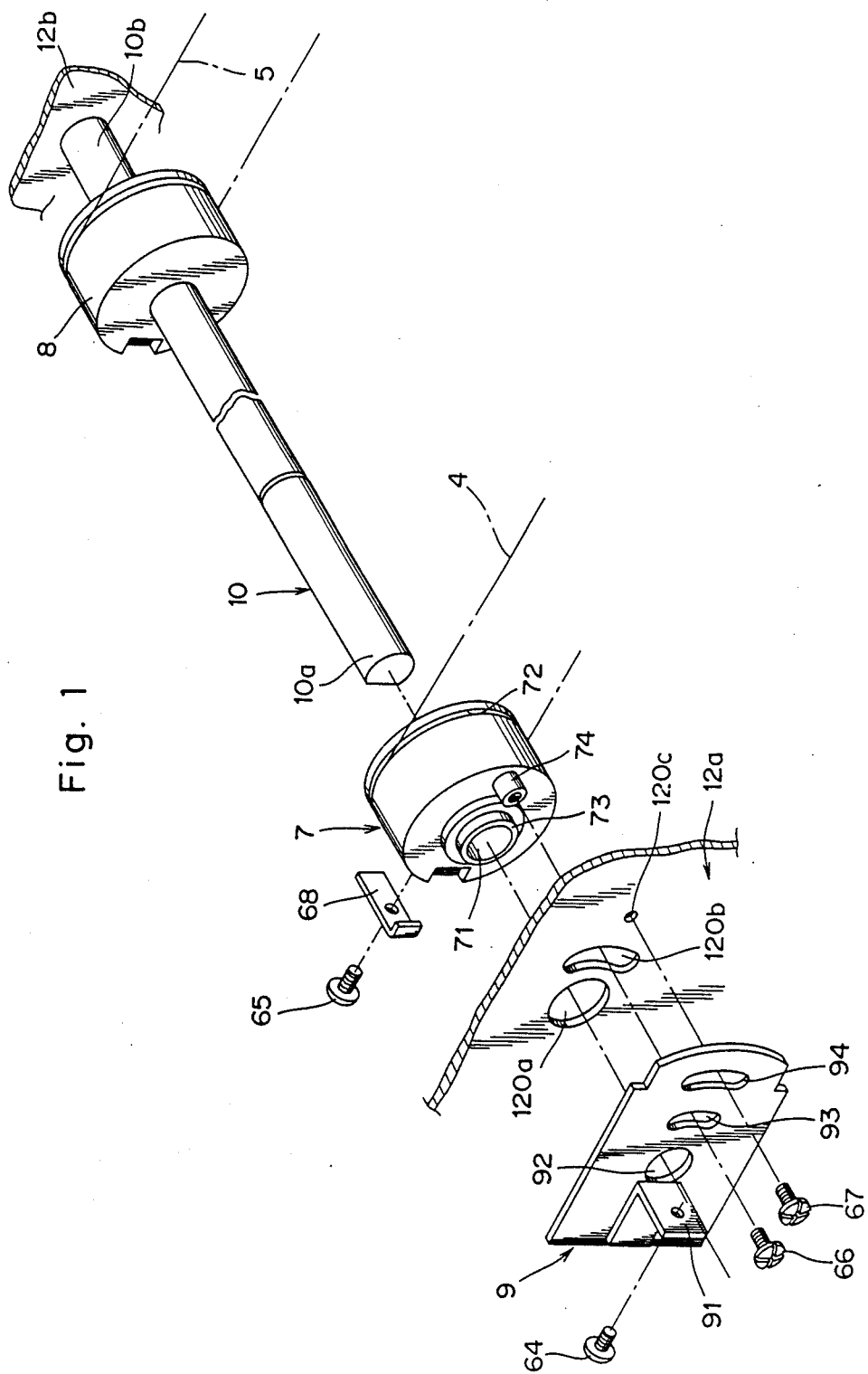
FIG. 1 is an exploded perspective view of main portions of the apparatus for adjusting optical system of an image forming apparatus in accordance with a first embodiment of the present invention.

With reference to FIG. 1, an end 10b of the shaft 10 passing through the second adjustment pulley 8, is attached thereto so as to be rotatable integrally therewith, and is rotatably supported by the lateral plate 12b.

Figure 2:
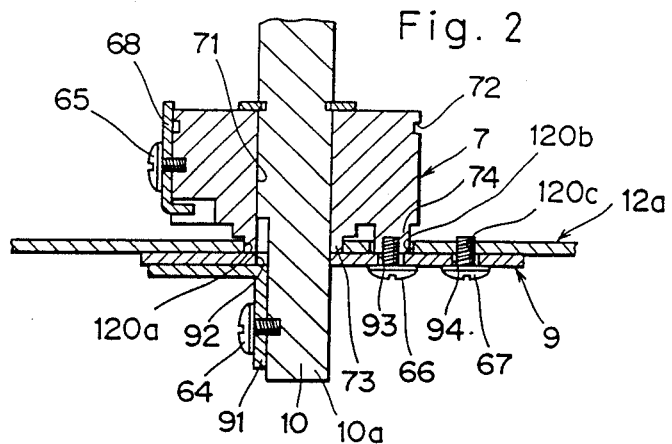
FIG. 2 is a section view of main portions of the apparatus in FIG. 1.

With reference to FIGS. 1 and 2, an end 10a of the shaft 10 passes, as passing through a shaft inserting hole 71 in the first adjustment pulley 7, through the lateral plate 12a. This end 10a also passes through a shaft inserting hole 92 in an adjustment plate 9, and is attached to an angle-like attachment piece 91 of the adjustment plate 9 by a shaft attachment screw 64. Accordingly, the shaft 10 is rotatable integrally with the adjustment plate 9.

The adjustment plate 9 is attached to the lateral plate 12a by an adjustment plate attachment screw 67 inserted in a track slot 94 and threadedly connected to a screw hole 120c in the lateral plate 12a. Accordingly, the adjustment plate 9 may be adjusted in rotation within a predetermined angular range in the circumferential direction of the shaft 10. The track slot 94 is made in the form of a circular arc extended along the circumference of a circle concentric with the center of rotation of the adjustment plate 9, such that the adjustment plate attachment screw 67 permits the adjustment plate 9 to be rotated.

The shaft 10 rotatable integrally with the adjustment plate 9 whih is rotatingly adjustable, is adjustable in rotation within a predetermined angular range in the circumferential direction thereof.

The first adjustment pulley 7 has a convex portion 73 which is inserted into a pulley inserting hole 120a in the lateral plate 12a and so supported by the lateral plate 12a as to be rotatable in the circumferential direction of the first adjustment pulley 7. The first adjustment pulley 7 thus supported by the lateral plate 12a, supports the shaft 10 and also serves as a bearing through which the shaft 10 is supported by the lateral plate 12a.

The first adjustment pulley 7 has a convex portion 74 which is inserted into a track slot 120b in the lateral plate 12a and which comes in contact with the back of the adjustment plate 9. This convex portion 74 is frictionally engaged with the back of the adjustment plate 9 by a pulley attachment screw 66 inserted into a track slot 93 in the adjustment plate 9. Accordingly, the first adjustment pulley 7 is attached to the adjustment plate 9 such that the pulley 7 is adjustable in rotation within a predetermined angular range in the circumferential direction thereof The track slot 120b in the lateral plate 12a is made in the form of a circular arc which permits the rotation of the convex portion 74 with the rotation of the first adjustment pulley 7. The track slot 93 in the adjustment plate 9 is made in the form of a circular arc which permits the rotation of the pulley attachment screw 66 with the rotation of the first adjustment pulley 7.

A wire fixing piece 68 for fixing one end of the wire 4 to the outer periphery of the first adjustment pulley 7, is secured to the outer periphery of the first adjustment pulley 7 by a screw 65. A guide groove 72 for guiding the wire 4 is formed in the outer periphery of the pulley 7.

Figure 3:
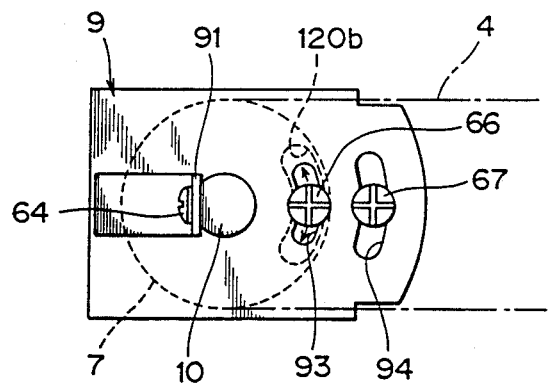
FIG. 3 and FIG. 4 are side views of main portions of the apparatus in FIG. 1, illustrating adjusting operations.

In the embodiment above-mentioned, with the adjustment plate 9 attached to the lateral plate 12a by the adjustment plate attachment screw 67, i.e., with the shaft 10 and the second adjustment pulley 8 regulated in rotation, the pulley attachment screw 66 may be loosened to rotatingly adjust the the position of the first adjustment pulley 7 with respect to the adjustment plate 9 (See FIG. 3). Thus, only the wire 4 fixed to the first adjustment pulley 7 may be moved to adjust the parallelism of the second moving frame 200 with respect to the first moving frame 100.

Figure 4:
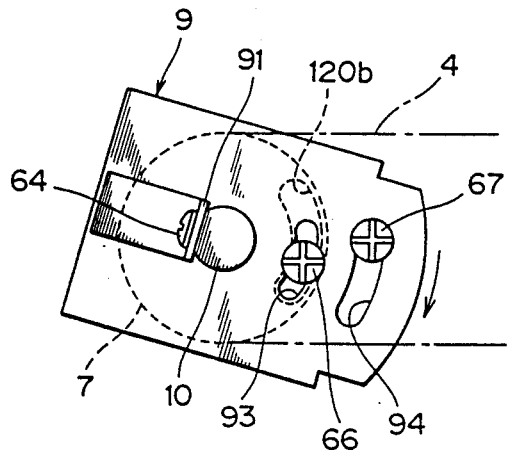

With the first adjustment pulley 7 engaged with the adjustment plate 9 by the pulley attachment screw 66, i.e., with the shaft 10, the adjustment plate 9, the first adjustment pulley 7 and the second adjustment pulley 8 being integrally rotatable, the adjustment plate attachment screw 67 may be loosened to rotatingly adjust the adjustment plate 9 in the rotation direction of the shaft 10 (See FIG. 4). Thus, both wires 4, 5 are moved to adjust the distance of the second moving frame 200 from the first moving frame 100.

Since the present invention is of the so-called pulley wrapping type where the wires 4, 5 are taken up by the first adjustment pulley 7 and the second adjustment pulley 8, the amounts of the wires to be wound are equal to the amounts of the wires to be unwound. More specifically, when for example the wire 4 is wound by the first adjustment pulley 7 in FIG. 5, the decrease amount of the wire length B from the floating pulley 210a to the first adjustment pulley 7 is equal to the increase amount of the wire length C from the pulley 57 to the floating pulley 210a. Accordingly, the tension of the wire 4 undergoes no change before and after the adjustment. The same is applied to the wire 5. Thus, since the tensions of the wires 4, 5 do not vary, the tensions of the wires 4, 5 are not out of balance after the adjustment. This provokes neither vibration nor shock on the first moving frame 100 and the second moving frame 200 at the time when the original document is scanned and exposed to light by the optical system 2.

The adjustment plate 9 is attached to the lateral plate 12a. Accordingly, the adjustments above-mentioned may be readily made without removal of the transparent platen 11, by operating, at the side of the electrophotographic copying machine 1, the pulley attachment screw 66 and the adjustment plate attachment screw 67. In particular, the arrangement that the adjustment plate 9 is attached to the outer surface of the lateral plate 12a, further facilitates the adjustments above-mentioned.

Further, one end 10a of the shaft 10 is inserted into the shaft inserting hole 71 in the first adjustment pulley 7 and the shaft inserting hole 92 in the adjustment plate 9. This enhances the positional precision of the first adjustment pulley 7 with respect to the adjustment plate 9.

The first adjustment pulley 7 has the cylindrical convex portion 73 around the shaft inserting hole 71. This convex portion 73 is inserted into the pulley inserting hole 120a in the lateral plate 12a. Accordingly, the first adjustment pulley 7 also serves as a bearing for supporting the shaft 10. This eliminates the provision of a bearing for this purpose, resulting in the simplification of the entire arrangement.

The adjustment plate 9 is attached to the lateral plate 12a by the adjustment plate attachment screw 67 threadedly connected to the lateral plate 12a through the track slot 94 in the form of a slot in the adjustment plate 9. The track slot 94 is extended along the circumference of a circle concentric with the center of rotation of the adjustment plate 9 such that the track slot 94 permits the rotation of the adjustment plate 9 with the adjustment plate attachment screw 67 loosened. Accordingly, the adjustment plate 9 may be adjusted in rotation by merely operating the adjustment plate attachment screw 67. This enhances the maneuverability.

Figure 7:
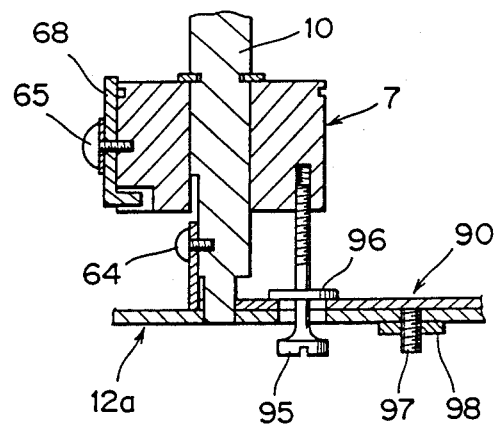
FIG. 7 is a section view of main portions of the apparatus in accordance with a second embodiment of the present invention.

As shown in FIG. 7, an adjustment plate 90 may be attached to the inner surface of the lateral plate 12a. In this case, a pulley attachment screw 95 threadedly connected to the first adjustment pulley 7 may be loosened, so that an engagement flange 96 disposed at a mid-portion of the pulley attachment screw 95 is frictionally engaged with the inner surface 90a of the adjustment plate 90. Thus, the first adjustment pulley 7 may be attached to the adjustment plate 90. Further, a screw rod 97 stands from the adjustment plate 90 and passes through the lateral plate 12a. By threadedly connecting an adjustment plate attachment nut 98 to this screw rod 97 the adjustment plate 90 may be attached to the lateral plate 12a.

Cogged belts and V belts may be employed instead of wires 4, 5.

The first and second adjustment pulleys 7, 8 may have semi-circle in cross section.

The apparatus for adjusting optical system of an image forming apparatus in accordance with the present invention should not be limited to the embodiments above-mentioned. Various modifications in design may be made of the present invention without departing from the scope thereof. For example, other wire arrangement may be adopted.

According to the apparatus for adjusting optical system of an image forming apparatus of the present invention, with the second member to be wrapped regulated in rotation by the adjustment plate, only the first member to be wrapped may be adjusted in rotation so that only the wrapping power transmission member secured to the first member to be wrapped is moved, thereby to adjust the parallelism between the moving frames. With the adjustment plate, the first member to be wrapped and the second member to be wrapped being integrally rotatable, the adjustment plate may be adjusted in rotation to move both wrapping power transmission members, thereby to adjust the distance between both moving frames. Further, the present invention is of the so-called pulley wrapping type. This restrains the wrapping power transmission member tensions from being out of balance, thereby to prevent the moving frames from being vibrated. Further, the adjustment plate is attached to the lateral plate. This facilitates the adjustments abovementioned which can be made at the side of the image forming apparatus. Thus, the present invention presents a variety of advantages.

What is claimed is:

1. Apparatus for adjusting optical system of an image forming apparatus, adapted to adjust the positions of a first moving frame and a second moving frame respectively engaged with a pair of wrapping power transmission members which are wrapped round pulleys and being installed with a predetermined distance provided therebetween, comprising:

a shaft rotatably supported by a pair of lateral plates;
   an adjustment plate disposed at one end of said shaft so as to be rotatable integrally therewith, said adjustment plate being attached to one of said lateral plates so as to be adjustable in rotation in the rotation direction of said shaft;
   a first member to be wrapped rotatably supported by said one end of said shaft, to which one of said wrapping power transmission members is secured; and
   a second member to be wrapped secured to the other end of said shaft, to which the other wrapping power transmission member of said wrapping power transmission members is secured,
   said adjustment plate and said first member to be wrapped being engaged with each other so as to be adjustable in relative rotation in the circumferential direction of said first member to be wrapped.

2. Apparatus for adjusting optical system of an image forming apparatus according to claim 1, wherein the one end of the shaft is inserted into a first inserting hole in the first member to be wrapped and a second inserting hole in the adjustment plate.

3. Apparatus for adjusting optical system of an image forming apparatus according to claim 1, wherein the adjustment plate is attached to the outer surface of the lateral plate 4. Apparatus for adjusting optical system of an image forming apparatus according to claim 3, wherein the first member to be wrapped has a cylindrical convex portion around the first inserting hole, said convex portion being inserted into a third inserting hole formed in the lateral plate.

5. Apparatus for adjusting optical system of an image forming apparatus according to claim 1, wherein the adjustment plate is attached to the lateral plate by an adjustment plate attachment screw threadedly inserted into said lateral plate through a slot in said adjustment plate, and said slot is extended along the circumference of a circle concentric with the center of rotation of said adjustment plate such that said slot permits the rotation of said adjustment plate with said adjustment plate attachment screw loosened.

* * * * *